April 19, 1927.  J. HARDIE  1,625,655
COOKING KETTLE
Filed Sept. 14, 1926
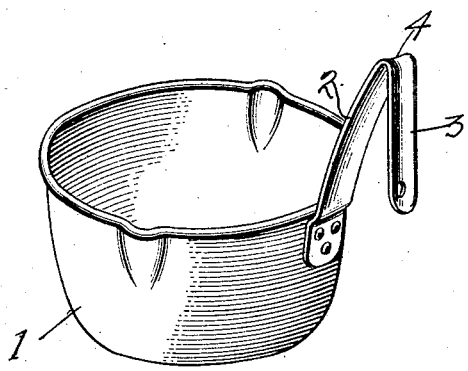
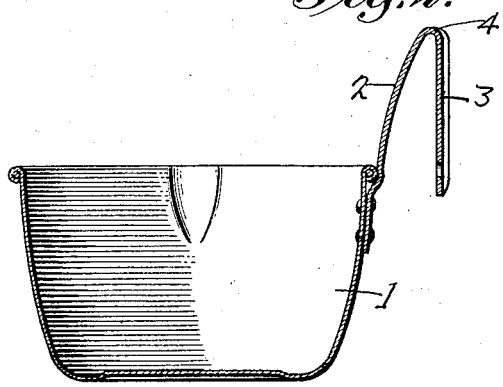
INVENTOR
Jessie Hardie
BY
R. W. Hardie
ATTORNEY Patented Apr. 19, 1927.

1,625,655

UNITED STATES PATENT OFFICE.

JESSIE HARDIE, OF ALBANY, NEW YORK.

COOKING KETTLE.

Application filed September 14, 1926. Serial No. 135,433.

This invention relates to improvements in the cooking kettles of ordinary construction having a long handle extending laterally therefrom in a slightly inclined line.

In such constructions the long handle projecting outwardly from the body of the kettle frequently causes the kettle to become upset by the body or hands of a user coming in contact therewith.

In such construction moreover, the kettle, if filled, will rock in the hand of a user, if gripped by one hand alone, and the contents thereof frequently becomes partially or wholly upset; therefore it is necessary to grip the kettles of that construction with both hands, one hand grasping the handle and the other hand grasping the upper margin of the bowl or body of the kettle with the aid of a cloth to protect the hand from being injured.

In such constructions, it is difficult to hold the kettle steadily in position by the aid of the handle alone, when mashing vegetables or other edibles contained therein, and it is likewise difficult to serve or remove the contents of a kettle of such construction, when held by the long handle.

This invention has for its main object, to provide a cooking kettle having a bowl or body of ordinary construction, and a handle that is free from the objectionable features of the long, laterally extending handles now in use, and adapted to enable the user to maintain a firm grip on the handle, so as to prevent the body of the kettle from rocking while in the hand of the user, and adapted to hold the kettle in a steady position while mashing the contents thereof, and in general to provide a cooking kettle of the character described that may be carried and controlled by one hand of a user without being inadvertently upset, and occupy less space than those now in use.

These and other objects of the invention are accomplished by the means hereinafter described, and illustrated in the accompanying drawings showing the invention in its preferred form; but it will be understood, that changes, modifications and alterations may be made therein without departing from the invention.

In the drawings, Figure 1 is a perspective view of a kettle embodying the invention, and Figure 2 is a side elevation of the kettle shown in Figure 1.

As illustrated in the drawings, 1 represents the bowl or body of a cooking kettle in general use. The kettle is provided with a handle formed in two, preferably integral, sections doubled over relative to each other. Both of said sections extend upwardly relative to the body of the kettle instead of outwardly and laterally thereof.

The inner section 2, extends from the upper portion of the body of the kettle, preferably in a curved line, so as to offset the upper end of said section from the vertical line of the wall of said body, while the outer section 3 preferably extends in a straight-line, either vertically or slightly inclined vertically, and preferably in substantially parallel arrangement with the axial line of said body.

The juncture of the upper portions of said sections forms an acute angle 4, so that as a user grasps the outer section 3 at the upper end thereof the fingers may be inserted into the notch formed by the two sections and obtain a firm hold on the handle.

By forming an acute angle at the juncture of said sections a hand having fingers of any size may be inserted snugly into the notch or angle formed by the handle sections, and obtain a firm control of the kettle for all manipulating purposes.

What I claim is:

1. A cooking kettle having a body, and a handle composed of a vertically extending inner section curved longitudinally, and a straight outer section extending in substantially parallel arrangement with the axial line of said body, said sections forming an acute angle at their upper ends.

2. A cooking kettle having a body, and a handle composed of a vertically extending, longitudinally curved, inner section, and a substantially straight outer section, the upper portions of said section gradually converging toward each other and forming an acute angle, of a width adapted to enable the front of a user's hand to bear against the outer straight section, and the back of the hand against the said inner curved section when the outer section of the handle is grasped by the user.

JESSIE HARDIE.